United States Patent [19]
Yamamoto

[11] Patent Number: 5,644,382
[45] Date of Patent: Jul. 1, 1997

[54] PHOTOGRAPHIC PRINTING APPARATUS

[75] Inventor: Yuji Yamamoto, Wakayama, Japan

[73] Assignee: Noritsu Koki Co., Ltd., Wakayama, Japan

[21] Appl. No.: 426,404

[22] Filed: Apr. 21, 1995

[30] Foreign Application Priority Data

Apr. 25, 1994 [JP] Japan .................................. 6-108988

[51] Int. Cl.$^6$ ................................................. G03B 27/34
[52] U.S. Cl. .......................... 355/55; 359/698; 359/821
[58] Field of Search ................................. 355/40, 41, 55, 355/58, 59, 56, 63; 359/821, 698, 702, 825; 396/529, 531

[56] References Cited

U.S. PATENT DOCUMENTS

| | | | |
|---|---|---|---|
| 3,996,596 | 12/1976 | Kurtik | 355/55 |
| 4,172,657 | 10/1979 | Watanabe et al. | 355/55 |
| 5,038,168 | 8/1991 | Kurimoto et al. | 355/56 |

FOREIGN PATENT DOCUMENTS 2088573   6/1982   United Kingdom .

*Primary Examiner*—Arthur T. Grimley
*Assistant Examiner*—David A. Lane
*Attorney, Agent, or Firm*—Oblon, Spivak, McClelland, Maier & Neustadt, P.C.

[57] ABSTRACT

A photographic printing apparatus includes a lens unit and a lens mount which are joined to each other in a separable manner. The lens mount includes therein a drive motor and a drive force transmitting mechanism to adjust the focal distance and aperture of the lens unit. A plurality of lens units having different focal distances are provided, from which a lens unit suitable for a printing magnification is automatically selected for printing. Each lens unit is provided with external connection members which are connected to an aperture adjusting mechanism and the focal distance adjusting mechanism of the lens unit. The lens mount to which the lens unit is attached is provided with members which are engaged with the external connection members of the lens unit to displace them. The displacement of these members is effected by motors provided on the lens mount. With this structure, the cost of lens units can be reduced, and the efficiency of the printing operation can be increased.

3 Claims, 5 Drawing Sheets

Fig.5

| LENS UNIT No. | SENSOR 1 | SENSOR 2 | SENSOR 3 |
|---|---|---|---|
| 1 | ○ | | |
| 2 | | ○ | |
| 3 | ○ | ○ | |
| 4 | | | ○ |
| 5 | ○ | | ○ |

PHOTOGRAPHIC PRINTING APPARATUS

BACKGROUND OF THE INVENTION

1. Field of the Invention

The present invention relates to a photographic printing apparatus, and more particularly to a photographic printing apparatus which has a mechanism for selecting a print size from a variety of print sizes, which can prevent an increase in the number of lens units used for printing due to an increase in the number of print sizes, and which can decrease the cost of lens units used for printing.

2. Description of the Related Art

With an increase in the number of print sizes and kinds of films, the frequency of changing the printing magnification during printing increases. Presently, a zoom lens is used to cope with frequent changes of magnification. However, since the printing magnification in actual printing varies over a considerable range from a very small magnification to a very large magnification, use of a single zoom lens is not suitable from the viewpoint of the quality of resulting pictures and the cost of the lens unit. Hence, a zoom lens which covers frequently used printing magnifications is used in combination with a variable focus lens covering other printing magnifications. Alternatively, two zoom lens which cover a lower-side magnification range and a higher-side magnification range, respectively, are selectively used.

In the above-described method in which a plurality of lens units are selectively used to cope With variation in the printing magnification, a large space is necessary to house the lens units. Therefore, lens units for printing must be made as compact as possible. However, such lens units actually become more complicated and larger due to a mechanism for automatic exposure.

SUMMARY OF THE INVENTION

An object of the present invention is to provide an improved photographic printing apparatus which can automatically effect exposure using a plurality of lens units which have a simple structure.

According to a first aspect of the present invention, there is provided a photographic printing apparatus in which a plurality of lens units are selectively used for printing. The photographic printing apparatus includes a variable focus lens unit having external connection members for operating a focal distance adjusting mechanism and an aperture adjusting mechanism provided in the variable focus lens unit, and a lens mount equipped with a drive unit which is engaged with the external connection members, when the lens unit is attached thereto, to move the external connection members.

According to a second aspect of the present invention, there is further provided a mechanism for automatically selecting a lens unit and for attaching the selected lens unit to the lens mount.

According to a third aspect of the present invention, the mechanism for automatically selecting a lens unit operates based on information such as the kind of film and the width of printing paper.

In the photographic printing apparatus according to the present invention, a lens mount equipped with a drive mechanism is used for a plurality of lens units. Accordingly, the overall costs of the apparatus can be decreased even when the printing magnification must be varied over a wide range. Also, no space is necessary to keep a plurality of lens units for printing, unlike conventional printing apparatuses.

BRIEF DESCRIPTION OF THE DRAWINGS

Various other objects, features and many of the attendant advantages of the present invention will be readily appreciated as the same becomes better understood by referring to the following detailed description of the preferred embodiments when considered in connection with the accompanying drawings, in which:

FIG. 5 is a table showing the manner of identifying lens units.

DETAILED DESCRIPTION OF THE PREFERRED EMBODIMENTS

Embodiments of the present invention will now be described in more detail with reference to the drawings.

Figure 1:
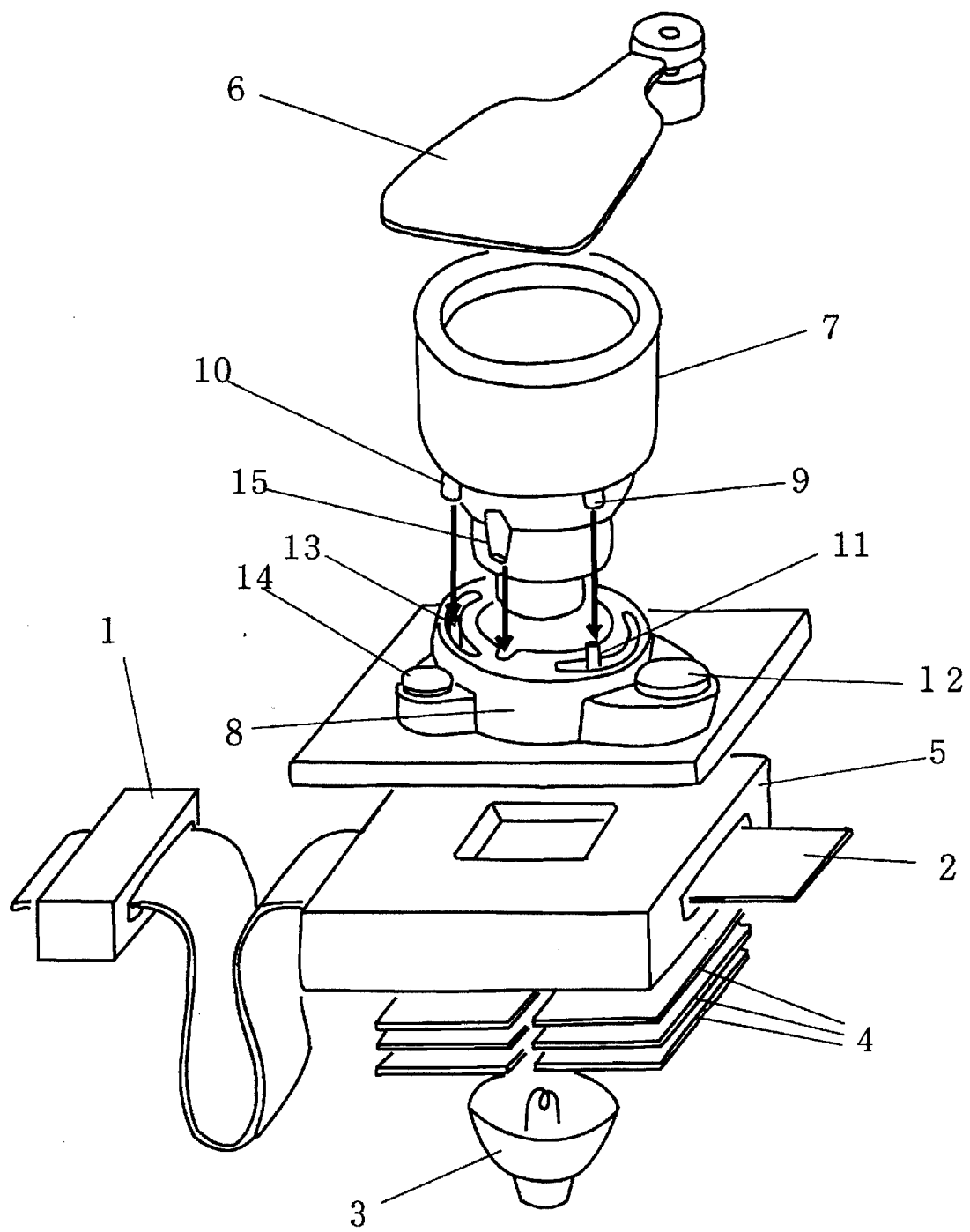
FIG. 1 is a perspective view showing a photographic printing apparatus according to an embodiment of the present invention.

FIG. 1 shows a photographic printing apparatus according to an embodiment of the present invention. This printing apparatus is composed of a lens unit and a lens mount. The lens unit has a variable aperture and a variable focal distance. The lens mount includes drive motors and a drive force transmitting mechanism to change the aperture and focal distance of the lens unit.

Numeral 1 denotes a scanner which serves as a means for computing exposure conditions based on information of the image to be printed. The scanner 1 captures an image on a negative film 2 and obtains image information necessary for printing, such as the kind of film, size and density of the image, and balance of colors. Also, a printing magnification is determined taking account of the width of printing paper which is detected by an unillustrated width sensor.

Light from an exposure light source 3 is regulated by an automatic light regulator 4 such that the light with a quality corresponding to exposure conditions is obtained. This makes it possible to optimally reproduce colors on the printing paper. While the film passes through a film mask 5, light having a regulated quality is irradiated to each frame of the film. The light passing through each frame of the film reaches the printing paper via a shutter 6 and a lens unit 7. The length of time for exposure is controlled by the shutter 6. The printing paper is subsequently fed to a developing section.

The lens unit 7 used in this embodiment is a zoom lens which includes a set of lenses, a focal distance adjusting mechanism and an aperture adjusting mechanism. The focal distance and aperture of the lens unit 7 are controlled by motors via a drive force transmitting mechanism which are built in a lens mount 8. The drive force transmitting mechanism of the lens mount 8 has a structure such that it is separably engaged with the lens unit 7.

In detail, the lens unit 7 is provided with a focal distance adjusting jack 9 connected to the focal distance adjusting mechanism and an aperture adjusting jack 10 connected to the aperture adjusting mechanism. The jack 9 serves as a first external connection member for adjusting the focal distance of the lens unit 7 to vary the printing magnification. The jack 10 serves as a second external connection member for adjusting the aperture of the lens unit 7 to vary the amount of light for printing.

The focal distance adjusting jack 9 is connected to a focal distance adjusting pin 11 when the lens unit 7 is attached to the lens mount 8. When the pin 11 is moved by a focus adjusting motor 12, its movement is transmitted to the jack 9, so that the focal distance of the lens unit 7 is adjusted.

The aperture adjusting jack 10 is connected to an aperture adjusting pin 13 when the lens unit 7 is attached to the lens mount 8. When the pin 13 is moved by an aperture adjusting motor 14, its movement is transmitted to the jack 10, so that the aperture of the lens unit 7 is adjusted. A positioning key 15 is provided on the lens unit 7 to position the lens unit 7 with respect to the lens mount 8, thereby providing accurate alignment between the pins and jacks.

Figure 2:
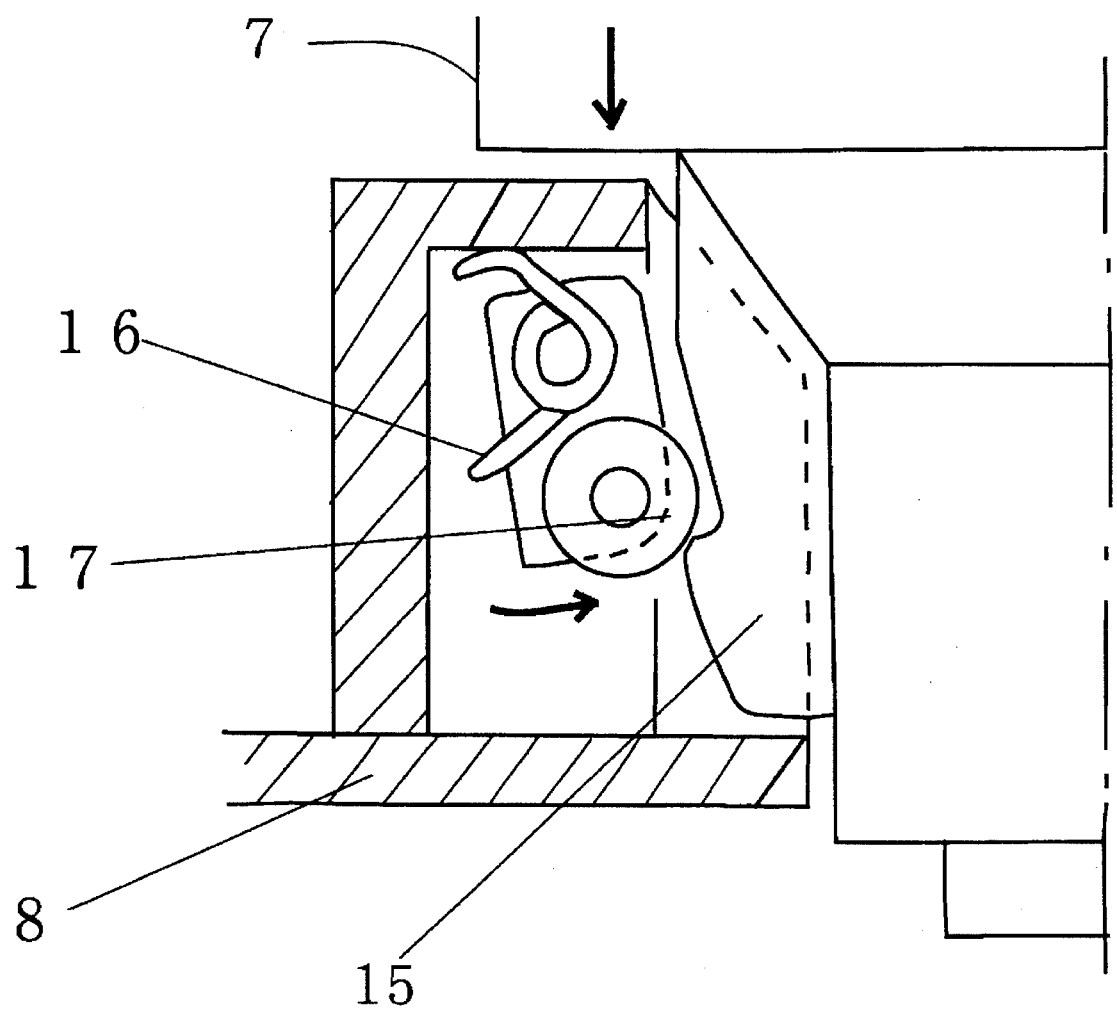
FIG. 2 is a sectional view showing a mechanism for fixing a lens unit to the lens mount of the photographic printing apparatus shown in FIG. 1.

FIG. 2 shows a mechanism for holding the lens unit 7 in the lens mount 8. When the lens unit 7 is inserted into the lens mount 8, a cam surface formed on the positioning key 15 of the lens unit 7 engages with a holding roller 17 which is forced by a holding spring 16 to swing inward. The positioning key 15 moves the holding roller 17 outward while rotating it, and reaches a predetermined mount position at which the lens unit 7 is held by the holding roller 17.

Figure 3:
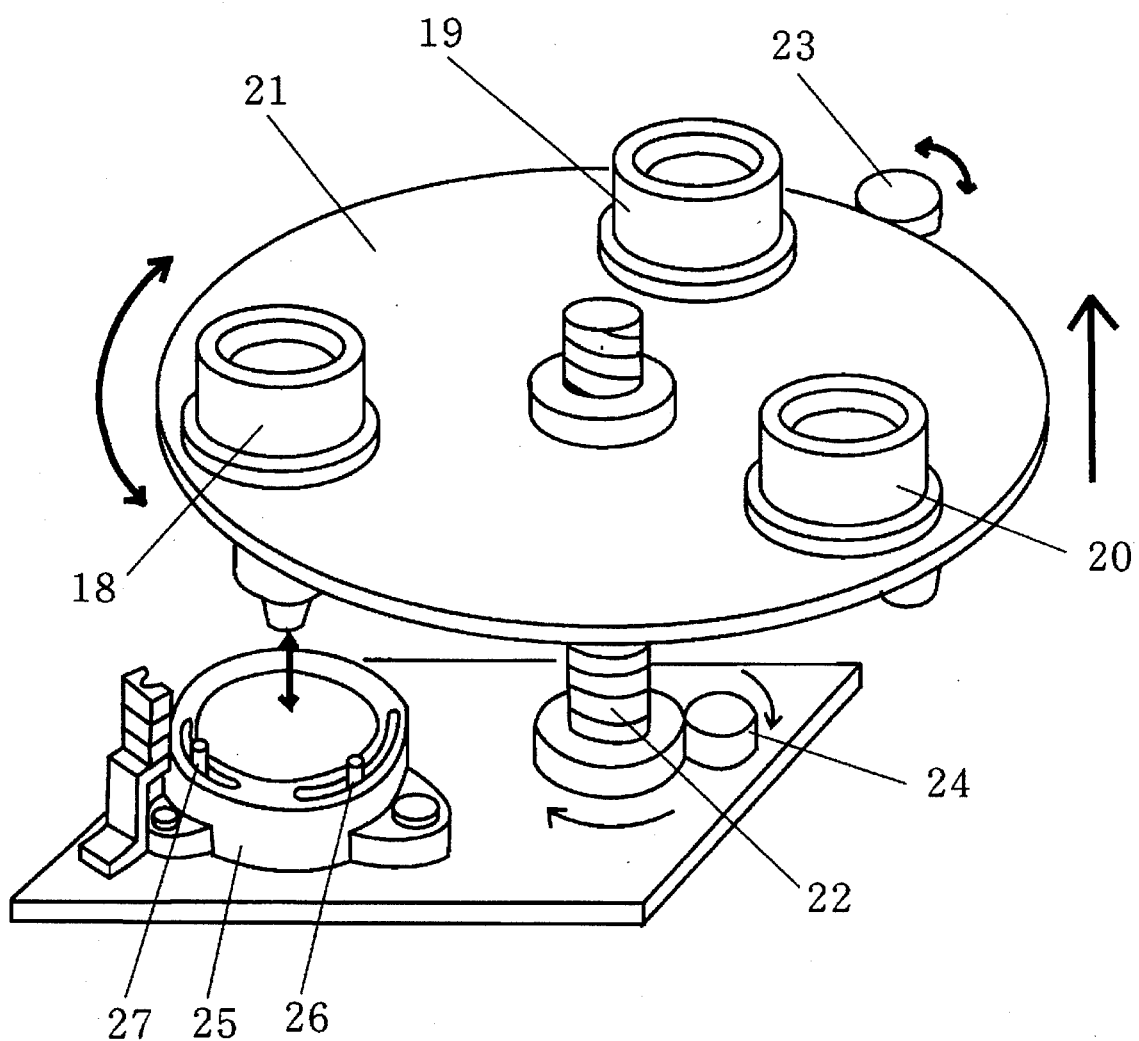
FIG. 3 is a perspective view showing a photographic printing apparatus according to another embodiment of the present invention in which a plurality of lens units are selectively used.
Figure 4:
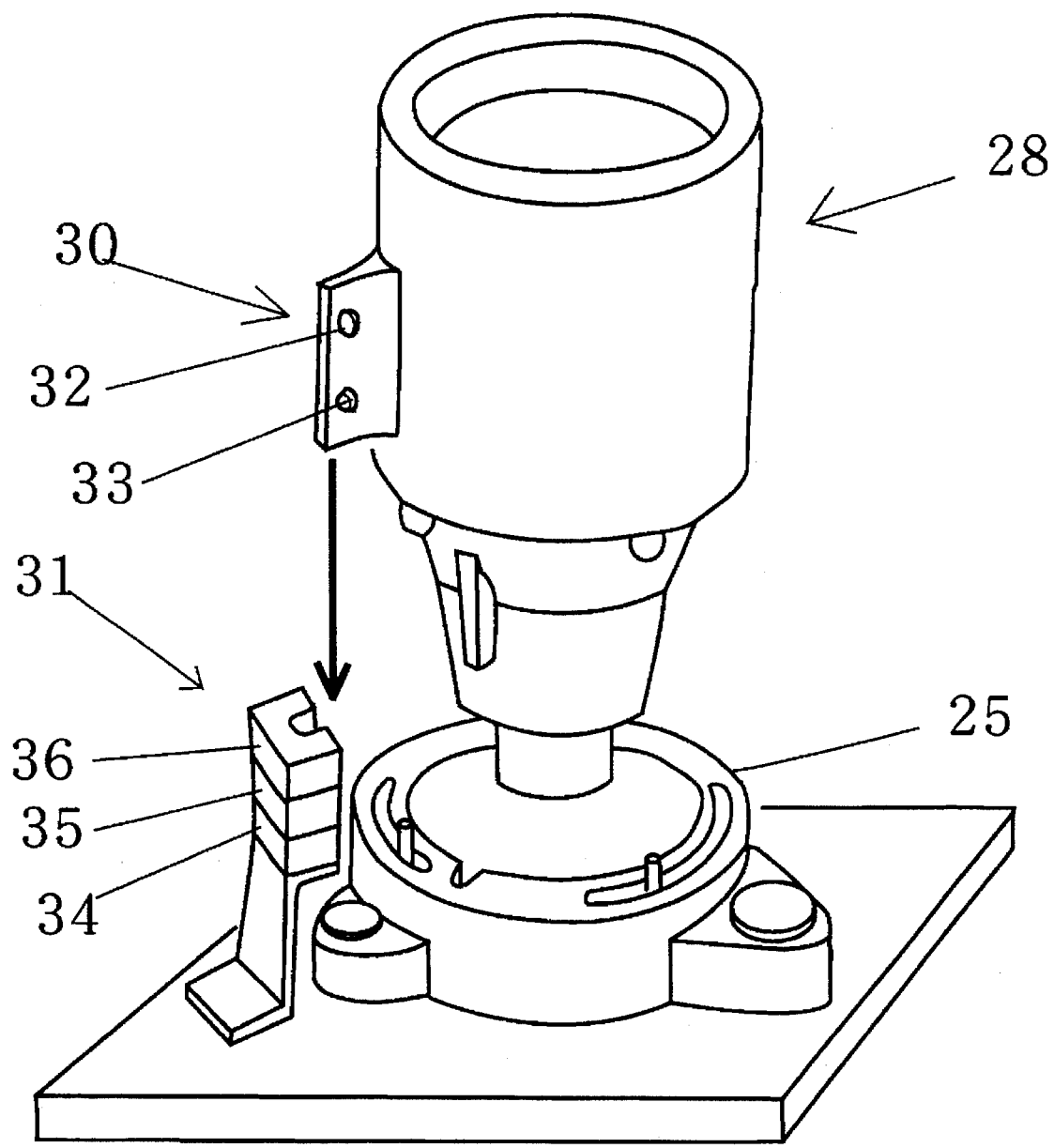
FIG. 4 is an enlarged perspective view showing the mechanism for identifying lens units which is used in the photographic printing apparatus shown in FIG. 3.

Next, a photographic printing apparatus according to another embodiment of the present invention will be described with reference to FIGS. 3 and 4. This printing apparatus is composed of a plurality of lens units having different focal distances and a lens mount. The aperture and focal distance of a lens unit selectively attached to the lens mount is controlled by drive motors which are provided in the lens mount.

Lenses 18, 19 and 20 are attached to a turntable 21 along a circle centered at the rotational axis of the turntable 21. The rotational axis (screw shaft 22) of the turntable 21 is parallel to the optical axis of the printing apparatus, and the turntable 21 is moved upward and downward in the direction parallel to the rotational axis. The joint portions of each lens unit and the lens mount are provided with pins and jacks similar to those shown in FIG. 1. These pins and jacks serve as a driving force transmitting means for varying the aperture and focal distance of a selected lens unit. Instead of the pins and jacks, gears may be used as the driving force transmitting means.

The turntable 21 is arranged above a lens mount 25. A drive motor 23 is provided for rotating an unillustrated drive roller which is contacted with the peripheral surface of the turntable 21 with pressure. Another drive motor 24 is provided to rotate the screw shaft 22. To remove a lens unit from the lens mount 25, the screw shaft 22 is rotated by the drive motor 24 so that the turntable 21 is elevated. The drive roller is vertically moved synchronously with the vertical movement of the turntable 21 so that the drive roller always contacts the turntable 21. Also, when the turntable 21 is vertically moved, the drive motor 23 is controlled to act as a brake for preventing the rotation of the turntable 21. Subsequently, the turntable 21 is rotated such that a lens unit 18 reaches a predetermined position above the lens mount 25.

The turntable 21 is then lowered to insert the selected lens unit 18 into the lens mount 25 for connection therewith. Thereafter, the next printing operation is started.

After the attachment of the lens unit 18, a focal distance adjusting pin 26 and an aperture adjusting pin 27 of the lens mount 25 are moved by motors. As a result, the focal distance adjusting jack and aperture adjusting jack of the lens unit 18 are moved to adjust the focal distance and the aperture in accordance with a printing magnification. When the lens unit 18 is exchanged, the turntable 21 is again elevated and rotated to select the next designated lens unit. This operation is repeated.

Next, a method for identifying the kind of lens units will be described. As shown in FIG. 4, the identification is made by detecting an identification mark provided on each lens unit. In the present embodiment, holes are used as a mark. When a lens unit 28 is attached to the lens mount 25, a lens unit identification member 30 of the lens unit 28 is inserted into a groove of a lens identifying device 31 provided in the vicinity of the lens mount 25.

Holes 32, 33 are formed in the lens identification member 30. Sensors 34, 35 and 36 are provided in the lens identifying device 31 at positions where the sensors face the holes. In the present embodiment, five kinds of lens units are identified using three sensors. In detail, sensors 34, 35 and 36 of the lens identifying device 31 are stacked in the vertical direction to detect the presence of holes in the lens identification member 30 so as to judge the focal distance of a lens unit attached to the lens mount 25. FIG. 5 shows the relationship between output signals of the sensors and the kinds of lens units.

Obviously, numerous modifications and variations of the present invention are possible in light of the above teachings. It is therefore to be understood that within the scope of the appended claims, the present invention may be practiced other than as specifically described herein.

What is claimed is:

1. A photographic printing apparatus in which a plurality of lens units are selectively used for printing, comprising:

a variable focus lens unit having a focal distance adjusting jack for operating a focal distance adjusting mechanism and an aperture adjusting jack for operating an aperture adjusting mechanism; and a lens mount equipped with a focal distance adjusting pin which is driven by a focal distance driving motor unit and an aperture adjusting pin which is driven by an aperture driving motor, wherein when said lens mount is engaged with said variable focus distance lens unit, said focal distance adjusting jack is engaged with said focal distance adjusting pin, and said aperture adjusting jack is engaged with said aperture adjusting pin.

2. A photographic printing apparatus as recited in claim 1, further comprising:

a plurality of said variable focus lens units, each having said focal distance adjusting jack and said aperture adjusting jack; and a mechanism for automatically selecting a lens unit and for attaching the selected lens unit to the lens mount.

3. A photographic printing apparatus as recited in claim 2, wherein said mechanism for automatically selecting a lens unit selects the lens unit based on at least one of a kind of film and a width of the printing paper.

* * * * *